H. M. ISAACS.
FOOD PRODUCT.
APPLICATION FILED APR. 7, 1911.
1,080,971.
Patented Dec. 9, 1913.
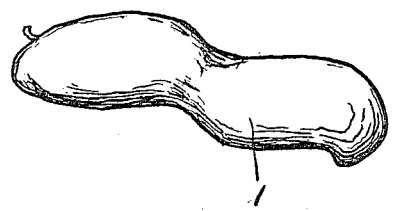
Fig. 1.
Fig. 2.
Fig. 3.
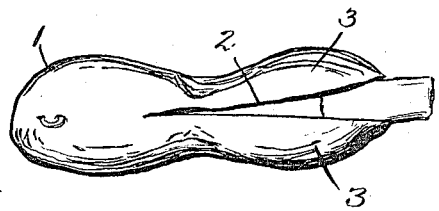
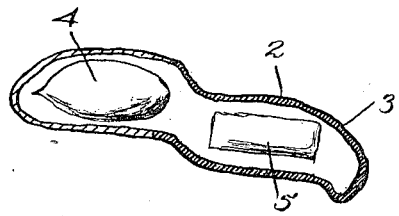
Fig. 5.
Fig. 6.
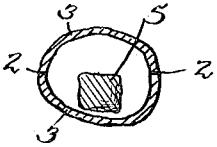
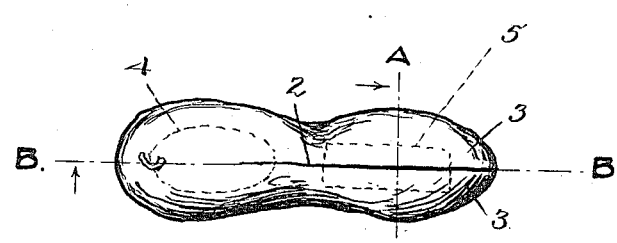
Fig. 4.
WITNESSES
Cornelius Zabriskie
Frances E. N. Blodgett.
INVENTOR:
Herbert M. Isaacs,
BY
Russell M. Everett,
ATTORNEY.

UNITED STATES PATENT OFFICE.

HERBERT M. ISAACS, OF NEWARK, NEW JERSEY.

FOOD PRODUCT.

1,080,971.  Specification of Letters Patent.  Patented Dec. 9, 1913.

Application filed April 7, 1911. Serial No. 619,460.

*To all whom it may concern:*

Be it known that I, HERBERT M. ISAACS, a citizen of the United States, residing at Newark, in the county of Essex and State of New Jersey, have invented certain Improvements in Food Products, of which the following is a specification.

This invention relates to that class of food products which combine in themselves nuts and candy so that the two are conveniently eaten together as a mixture.

The objects of the present invention are to combine nuts and candy in a novel and attractive manner; to provide a food product of this sort in which the real character of the food product may not be apparent until one begins to partake of it; to so combine candy with nuts as that the food products may be conveniently handled without softening, or soiling the fingers; to utilize the natural shell of the nut as a container for the candy also; to thus effect a combination of results in a simple and inexpensive manner, and to obtain other advantages and results as may be brought out in the following description.

Referring to the accompanying drawings, in which like numerals of reference indicate the same parts throughout the several figures, Figure 1 is a side view of a peanut such as I prefer to employ to produce my improved food product; Fig. 2 is a perspective view of a piece of candy such as may be employed in producing my improved food product; Fig. 3 is an edge view of the peanut with one of its kernals removed and a piece of candy being inserted in place thereof; Fig. 4 is a similar edge view with the piece of candy inside and the shell closed; Fig. 5 is a central longitudinal section of a food product of my improved construction, taken along the line of splitting of the peanut shell, and Fig. 6 is a transverse section of the same, taken on line A—A of Fig. 4.

In said drawings, 1 indicates the shell of an ordinary peanut, which in carrying out my invention is split for a portion of its length, as at 2, so that the halves 3, 3 of the shell will spring apart far enough to permit the kernal at that end of the peanut to be extracted, the kernel 4 at the other end of the peanut remaining in place. A piece of candy 5 is inserted between the sprung-apart ends 3, 3 to replace the peanut kernel which has been removed, and then the halves 3, 3 of the peanut shell are allowed to close together again. Preferably the split edges of the peanut shell are moistened with an adhesive before being allowed to close, so that they adhere when brought together, as shown in Fig. 4.

I thus produce a food product consisting of a peanut shell containing at one end a peanut kernel and at the other end a piece of candy, the whole having the appearance of an ordinary peanut. When eaten, therefore, a piece of candy is obtained for every peanut kernel and an even mixture of the two thus secured, the proportions of which mixture can be varied by varying the size of the piece of candy. Moreover, the candy can be varied in nature or kind to suit different tastes. A food product prepared in this form can be eaten without the candy softening in the fingers or soiling the same, since the candy is separated into small pieces ready for eating, which are protected by the peanut shell until taken into the mouth.

Obviously, the candy could be introduced into the emptied end of the peanut shell in a softened form so as to harden or be molded therein, if desired. Furthermore, other nuts besides peanuts can be used for my purpose, such as English walnuts, for example, where one-half of the kernel can be taken out and replaced by candy. It is immaterial what kind of nut is used, so long as a portion of the kernel can be removed, a piece of candy inserted and the shell closed again, but I prefer peanuts because they are well adapted to the purpose, are generally eaten, and so forth. Again, it might be possible that some one would wish to insert a piece of some other edible matter than candy into the cavity of a nut-shell made by removing a portion of the kernel, and I wish to be understood as covering this also by my present invention. A raisin might be substituted for the removed kernel, or any other kind of edible material which could be agreeably eaten with the nut.

Having thus described the invention, what I claim is:

1. The herein-described food product, consisting of a portion of edible nut meat or kernel and a portion of other edible matter inclosed together in the natural shell of a nut.

2. The herein-described food product, consisting of an edible nut meat or kernel and a piece of candy inclosed together in the natural shell of a nut normally containing two meats or kernels.

3. The herein-described food product, consisting of a portion of edible nut meat remaining in natural position in the shell of a nut from which the rest of the edible meat has been removed and a piece of edible matter of another kind inclosed within said shell in the cavity formed by the said removal of a portion of the edible nut meat.

HERBERT M. ISAACS.

Witnesses:
CORNELIUS ZABRISKIE,
FRANCES E. BLODGETT.

Copies of this patent may be obtained for five cents each, by addressing the "Commissioner of Patents, Washington, D. C."